United States Patent [19]

Gaylord

[11] 4,261,870

[45] Apr. 14, 1981

[54] PEROXYESTER-MONOSACCHARIDE REDOX CATALYST SYSTEM FOR VINYL CHLORIDE POLYMERIZATION

[75] Inventor: Norman G. Gaylord, New Providence, N.J.

[73] Assignee: Dart Industries Inc., Los Angeles, Calif.

[21] Appl. No.: 106,329

[22] Filed: Dec. 21, 1979

[51] Int. Cl.³ ............................................... C08L 5/00
[52] U.S. Cl. ..................... 260/17.4 SG; 260/17.4 UC; 526/200
[58] Field of Search .................................. 260/17.4 SG

[56] References Cited

U.S. PATENT DOCUMENTS

| | | | |
|---|---|---|---|
| 3,179,646 | 4/1965 | Ingraham | 526/200 |
| 3,340,243 | 9/1967 | Beer et al. | 526/200 |
| 3,966,696 | 6/1976 | Kidoh | 526/200 |

FOREIGN PATENT DOCUMENTS 444788  2/1967  Japan ................................ 260/17.4 SG

*Primary Examiner*—Edward M. Woodberry
*Attorney, Agent, or Firm*—Bryant W. Brennan; Harold R. Beck

[57] ABSTRACT

A process for the bulk or suspension polymerization of vinyl chloride in the presence of a redox catalyst system consisting of a peroxyester and a monosaccharide or a carboxylic acid ester of a monosaccharide.

16 Claims, No Drawings

4,261,870

PEROXYESTER-MONOSACCHARIDE REDOX CATALYST SYSTEM FOR VINYL CHLORIDE POLYMERIZATION

FIELD OF THE INVENTION

This invention relates to a process for the polymerization of vinyl chloride, in bulk or suspension systems, using a redox catalyst system consisting of a peroxyester and a monosaccharide or monosaccharide carboxylic acid ester.

BACKGROUND OF THE INVENTION

The suspension polymerization of vinyl chloride is generally carried out at temperatures below 70° C. using organic soluble initiators. Although lauroyl peroxide was earlier the most widely used catalyst, in recent years other low temperature catalysts including azobisisobutyronitrile, diisopropyl peroxydicarbonate, t-butyl peroxypivalate and mixtures thereof, have been adopted. These and other catalysts are described in Pennwalt Corporation, Lucidol Division, Technical Bulletin 30.90, "Free Radical Initiators for the Suspension Polymerization of Vinyl Chloride" (1977).

The choice of initiator is dictated by its half-life and by its influence on the polymerization process and the properties of the poly(vinyl chloride) produced thereby.

The polymerization of vinyl chloride is characterized by a short induction period, followed by a gradually increasing rate of polymerization. During the earlier stages of polymerization, the reaction rate is lower than the maximum so that the capacity of the reactor is not fully utilized. Peroxyesters reduce the induction period and, due to a more constant rate of polymerization, increase reactor productivity. Further, peroxyesters can generally be used at levels below that needed for peroxides and give much less chain branching during polymerization.

Although peroxyesters such as diisopropyl peroxydicarbonate and t-butyl peroxypivalate offer numerous advantages in vinyl chloride polymerization, their disadvantages include the necessity for low temperature shipping and storage and decreased efficiency at elevated temperatures.

The use of peroxyesters having higher decomposition temperatures is not feasible in present poly(vinyl chloride) production facilities due to the higher monomer pressures involved and the low molecular weight and poorer stability of the resultant resins. Nevertheless, the handling advantages of such peroxyesters makes their use extremely attractive.

The use of higher temperature catalysts at lower temperatures is a common practice in polymer technology. Thus, redox systems such as ammonium persulfate-sodium metabisulfite and hydrogen peroxide-ferrous sulfate are used in emulsion polymerization while benzoyl peroxide-dimethylaniline and methyl ethyl ketone peroxide-cobalt naphthenate are used in styrene-unsaturated polyester polymerization.

Reducing agents used in conjunction with monomer-soluble peroxyesters in the polymerization of vinyl chloride include potassium metabisulfite (N. Fischer and C. Lambling, French Pat. No. 2,086,635 (1972), sodium bisulfite (H. Minato, K. Hashimoto, and T. Yasui, Japan. Pat. No. 68 20,300 (1968), sodium bisulfite-cupric chloride (B. K. Shen, U.S. Pat. No. 3,668,194 (1972), sodium dithionite-ferrous sulfate (H. Minato, Japan. Pat. No. 70 04,994 (1970) and trialkyl boron (R. Kato and I. Soematsu, Japan. Pat. No. 5498('65) (1965); A. V. Ryabov, V. A. Dodonov, and Y. A. Ivanova, Tr. Khim. Khim. Tekknol., 1970, 238; Stockholms Superfosfat Fabriks A/B, Brit. Pat. No. 961,254 (1964).

Various sugars including glucose, dextrose, fructose and sorbose have been used as activators in "activated recipes" for the emulsion polymerization of butadiene and styrene. These so-called "sugar-iron-peroxide" recipes contain benzoyl peroxide, cumene hydroperoxide or other hydroperoxides as oxidant, ferric or ferrous salts as reducing agent, a sugar as "activator" and, generally, sodium pyrophosphate as complexing agent (F. A. Bovey, I. M. Kolthoff, A. I. Medalia, and E. J. Meehan, "Emulsion Polymerization", Interscience Publishers, New York, 1955, pp. 85–89 and 374–390). Dextrose has also been used in a cumene-hydroperoxide-ferrous sulfate-sodium pyrophosphate catalyst system for the graft copolymerization of styrene and acrylonitrile onto a polybutadiene latex (W. C. Calvert, U.S. Pat. No. 3,238,275 (1966); T. Sakuma and I. Makamura, Japan Pat. No. 13,635 ('66) (1966).

SUMMARY OF THE INVENTION

An object of the present invention is to provide a process for the polymerization of vinyl chloride, in the presence of peroxygen compounds at temperatures at which the latter are stable and readily handled. Another object of the present invention is to provide a process for the bulk and suspension polymerization of vinyl chloride at temperatures below 70° C. using peroxygen compounds which, at these temperatures, do not generate free radicals at a sufficient rate to initiate polymerization at a practical rate, if at all.

It has now been found that this improvement in vinyl chloride polymerization can be achieved by utilizing a redox catalyst system consisting of a peroxyester and a monosaccharide or monosaccharide carboxylic acid ester.

DETAILED DESCRIPTION OF THE INVENTION

According to the present invention, the polymerization of vinyl chloride is carried out in bulk or suspension, under the conditions applicable thereto and well known to those skilled in the art, using a catalyst system consisting of a monomer-soluble peroxyester and a reducing agent which is a monosaccharide or a carboxylic acid ester of a monosaccharide.

The half-life of a free radical catalyst is the time required for 50% decomposition at a particular temperature. The half-life is only relevant as regards the temperature at which it is desired to conduct a polymerization, e.g. the polymerization of vinyl chloride below 70° C. to produce poly(vinyl chloride) with greater thermal stability than polymer produced above 70° C. The half-life of a peroxyester refers to thermal decomposition and, consequently, if a polymerization is to be conducted at 50° C., a catalyst with a half-life of 20 hours or less at 50° C., can be used for the polymerization, e.g. t-butyl peroxypivalate or t-butyl peroxyneodecanoate, as is well known to those skilled in the art.

However, if it is desired to conduct the polymerization with a catalyst which does not require refrigerated shipment and/or storage, which are required by t-butyl peroxypivalate and t-butyl peroxyneodecanoate, than in accordance with the present invention, a catalyst with a half-life of more than 50 hours at 50° C. can be used in the presence of a suitable reducing agent, e.g. t-butyl peroxyoctoate which has a half-life of 133 hours at 50° C. in the absence of the reducing agent may be used.

Alternatively, if it is desired to conduct polymerization at or below 25° C., in order to maintain better control of the reaction exotherm or to obtain a higher molecular weight, less branched polymer, the aforementioned peresters, despite the requirement for refrigerated shipping and storage, having half-lives of more than 150 hours at 25° C., may be used in the presence of a suitable reducing agent.

The process of the present invention utilizes a peroxyester, in the presence of a suitable reducing agent, at a temperature where the peroxyester has a half-life of more than 50 hours in the absence of the reducing agent.

The peroxyesters which may be used in the process of the present invention are the alkyl and aralkyl peroxyesters of aliphatic or aromatic carboxylic acids or carbonic acid and may be represented by the structural formula

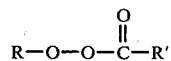

where R is an alkyl, aralkyl or alkoxycarbonyl group, R' is an alkyl, aralkyl, aryl or alkoxy group, and R and R' are the same or different. When R and/or R' contain alkyl or aralkyl moieties, the latter may contain 1-20 carbon atoms and may be primary, secondary or tertiary, linear or branched, acyclic or cyclic, saturated or unsaturated and may contain non-hydrocarbon substituents including halogen and hydroxyl groups. When R' is an aromatic moiety, it may be unsubstituted or may contain hydrocarbon, halogen and/or other substituents.

The peroxyesters may be monoperoxyesters or the diperoxyesters of dicarboxylic acids or diols.

Representative peroxyesters include t-butyl peroxyacetate, t-butyl peroxyisobutyrate, t-butyl peroxypivalate, t-butyl peroxyneodecanoate, t-butyl peroxybenzoate, t-butyl peroxyoctoate, t-butyl peroxy(2-ethylhexanoate), t-amyl peroxyneodecanoate, cumyl neodecanoate, isobutyl peroxypivlate, sec-butyl peroxybenzoate, n-butyl peroxyoctoate, t-butyl peroxy-3,3,5-trimethylhexanoate, t-butyl peroxy-2-methylbenzoate, 2,5-dimethyl-2,5-bis(2-ethylhexanoylperoxy)hexane, 2,5-dimethyl-2,5-bis (benzoylperoxy)hexane, 2,5-dimethyl-2,5-bis(octanoylperoxy)-hexane, di-t-butyl diperoxyphthalate, t-butyl peroxymaleic acid, t-butyl peroxyisopropylcarbonate, di(sec-butyl)peroxydicarbonate, bis(4-t-butylcyclohexyl)peroxydicarbonate, diisopropyl peroxydicarbonate, di(n-propyl)peroxydicarbonate, di(2-ethylhexyl)peroxydicarbonate, dicyclohexyl peroxydicarbonate, dicetyl peroxydicarbonate and the like.

The process of the present invention is carried out with a redox catalyst system consisting of a monomer-soluble peroxygen compound, i.e. a peroxyester, and a reductant. In bulk polymerization, a monomer-soluble reductant is required, while suspension polymerization permits the use of either a monomer-soluble or a monomer-insoluble reductant.

The monosaccharides which may be used as reductants in the practice of the present invention include pentoses and hexoses wherein the carbonyl group is either an aldehyde or a ketone, i.e. polyhydroxyaldehydes commonly referred to as aldoses and polyhydroxyketones commonly referred to as ketoses.

Representative monosaccharides or reducing sugars include arabinose, xylose, lyxose, ribose, glucose, gulose, mannose, allose, galactose, tallose, altrose, idose, fructose and sorbose.

The carboxylic acid esters of the monosaccharides which may be used as reductants in the present invention include the esters of aliphatic and aromatic carboxylic acids. The aliphatic carboxylic acids contain 1-26 carbon atoms and may be linear or branched, cyclic or acyclic, saturated or unsaturated. The aromatic carboxylic acids may be substituted or unsubstituted.

Representative carboxylic acid esters include the esters of acetic acid, propionic acid, butyric acid, octanoic acid, stearic acid, benzoic acid and the like.

The concentration of peroxyester is generally 0.01-5% by weight of the vinyl chloride, with a preferred concentration of 0.05-1% by weight. The peroxyester/reductant mole ratio is generally 1/0.01-2, with a preferred mole ratio of 1/0.1-1.

The redox catalyst system consisting of a peroxyester and a monosaccharide or a carboxylic acid ester of a monosaccharide may also contain the stannous or antimony (III) salt of an aromatic or aliphatic carboxylic acid. The presence of the metal carboxylate permits the use of lower concentrations of the peroxyester. The monosaccharide/metal carboxylate mole ratio is generally 1/0.01-1. Representative carboxylates are derived from aromatic carboxylic acids or aliphatic carboxylic acids which contain 1-26 carbon atoms and may be linear or branched, cyclic or acyclic, saturated or unsaturated, including the stannous and antimony (III) salts of acetic acid, propionic acid, butanoic acid, caproic acid, lauric acid, stearic acid and the like.

The procedures normally used in the suspension polymerization of vinyl chloride are applicable to the process of the present invention. Typical procedures are described in Encyclopedia of Polymer Science and Technology, 14, 339-343 (1971), the disclosure of which is incorporated herein by reference.

The polymerization may be conducted at or above atmospheric pressure. In the usual procedure, the reactor is charged at atmospheric pressure and the pressure rises when the contents of the reactor are brought to reaction temperature. The pressure may increase further due to the reaction exotherm and then remain constant until the conversion reaches about 70%, after which it decreases rapidly as the reaction continues.

The polymerization temperature may range from −50° to +70° C. for bulk polymerization, although temperatures of 40° to 60° C. are preferred. Suspension polymerization may be carried out at temperatures of +5° to +70° C., although preferred temperatures are in the 20°-60° C. range.

The concentrations of monomer and water, e.g. about 2/1 weight ratio, and the types and concentrations of suspending agents are those normally used in suspension polymerization and are well known to those skilled in the art. Typical suspending agents include poly(vinyl alcohol), partially saponified poly(vinyl acetete), gelatin, methylcellulose, vinyl acetate-maleic anhydride copolymer and the like. Various emulsifiers such as sulfonated oils and ethylene oxide condensation products may be added to control surface tension and particle shape. Buffers may be used, where necessary, e.g. when gelatin is used as suspending agent. Chain transfer agents such as chlorinated hydrocarbons and isobutylene may be used in the preparation of low molecular weight polymer.

Although the peroxyester-monosaccharide or -monosaccharide carboxylic acid ester catalyst system of the present invention is particularly useful in the bulk and suspension polymerization of vinyl chloride, the redox system may also be used in the copolymerization of vinyl chloride with vinylidene chloride, vinyl acetate, and other monomers which undergo copolymerization with vinyl chloride.

The following examples are illustrative embodiments of the practice of the present invention and are not to be construed as limitations on the invention or the claims. Numerous modifications will be obvious to those skilled in the art.

EXAMPLE I

A. A 4 oz glass bottle was charged with the following suspension recipe:
21 ml distilled water (boiled)
1 ml 1% aqueous solution of Tween 60 (polyoxyethylene sorbitan monostearate, Atlas Chemical Industries Inc.)
1 ml 1% aqueous solution of Span 60 (sorbitan monostearate, Atlas Chemical Industries Inc.)
2 ml 1% aqueous solution of Methocel A-15 (methylcellulose with viscosity of 15 cps as a 2% aqueous solution, Dow Chemical Co.)
Nitrogen was bubbled through the aqueous solution for 15 minutes.

Gaseous vinyl chloride was purified by passage through two 5% aqueous sodium hydroxide solutions, dried by passage through a silica gel column and then condensed with the aid of a dry ice bath. After 0.041 g (0.23 mmole) glucose and 10 g liquid vinyl chloride were added to the suspension recipe, the bottle was closed with a screw cap containing a center hole and a self-sealing gasket. The addition of 0.055 ml (0.23 mmole) t-butyl peroxyoctoate (0.5% by weight of vinyl chloride) was made by injection through the gasket using a hypodermic syringe. The bottle was placed in a 50° C. constant temperature bath and shaken for 7 hours. The bottle was removed from the bath and the residual monomer was released by inserting a needle into the gasket. The yield of poly(vinyl chloride) was 4.1 g (41% conversion). B. A bottle was charged in the same manner and with the same reactants as in A, except for the omission of glucose. No polymer was isolated after 7 hours at 50° C.

EXAMPLE II

The procedure of Example I was repeated, using the same suspension recipe, with 10 g vinyl chloride, 0.055 ml (0.23 mmole) t-butyl peroxyoctoate (0.5% by weight of vinyl chloride) and 0.02 g (0.115 mmole) glucose. After 7 hours at 50° C., the yield of polymer was 3.9 g (39% conversion).

EXAMPLE III

The procedure of Example I was repeated, using the same suspension recipe, with 10 g vinyl chloride, 0.022 ml (0.092 mmole) t-butyl peroxyoctoate (0.2% by weight of vinyl chloride) and 0.017 g (0.092 mmole) glucose. After 7 hours at 50° C., the yield of polymer was 2.0 g (20% conversion).

EXAMPLE IV

The procedure of Example I was repeated, using the same suspension recipe, with 10 g vinyl chloride, 0.055 ml (0.23 mmole) t-butyl peroxyoctoate (0.5% by weight of vinyl chloride) and 0.041 g (0.23 mmole) sorbose. The conversion was 31% after 7 hours at 50° C.

EXAMPLE V

The procedure of Example I was repeated, using the same suspension recipe, with 10 g vinyl chloride, 0.055 ml (0.23 mmole) t-butyl peroxyoctoate and 0.041 g (0.23 mmole) fructose. The conversion was 30% after 7 hours at 50° C.

EXAMPLE VI

The procedure of Example I was repeated, using the same suspension recipe, with 10 g vinyl chloride, 0.055 ml (0.23 mmole) t-butyl peroxyoctoate and 0.09 g (0.23 mmole) α-glucose pentaacetate. The bottle was shaken at 50° C. for 7 hours to yield 4.5 g (45% conversion) polymer.

EXAMPLE VII

The procedure of Example I was repeated with 10 g vinyl chloride, 0.055 ml (0.23 mmole) t-butyl peroxyoctoate and 0.045 g (0.115 mmole) α-glucose pentaacetate. After 16 hours at 50° C. the yield of polymer was 7.2 g (72% conversion).

EXAMPLE VIII

The procedure of Example I was repeated with 10 g vinyl chloride, 0.055 ml (0.23 mmole) t-butyl peroxyoctoate and 0.018 g (0.092 mmole) β-glucose pentaacetate. The yield of polymer was 4.0 g (40% conversion) after 7 hours at 50° C.

EXAMPLE IX

The procedure of Example I was repeated with 10 g vinyl chloride, 0.055 ml (0.23 mmole) t-butyl peroxyoctoate and 0.156 g (0.23 mmole) sucrose octaacetate. The yield of polymer was 3.1 g (31% conversion) after 7 hours at 50° C.

EXAMPLE X

A 6 oz glass bottle was charged with the following suspension recipe:
42 ml distilled water
2 ml 1% aqueous solution of Tween 60
2 ml 1% aqueous solution of Span 60
4 ml 1% aqueous solution of Methocel A-15
Nitrogen was bubbled through the aqueous solution for 15 minutes.

The bottle was charged with 20 g liquid vinyl chloride, 0.044 ml (0.184 mmole) t-butyl peroxyoctoate (0.2% by weight of vinyl chloride) and 0.0165 g (0.092 mmole) α-D(+)-glucose (dextrose), as described in Example I. After 16 hours at 50° C., the yield of poly(vinyl chloride) was 9.2 g (46% conversion).

EXAMPLE XI

The procedure of Example X was repeated using the same suspension recipe and reactants. In addition, 0.005 g (0.0092 mmole) stannous laurate (glucose/stannous laurate mole ratio=10/1) was c arged to the reaction mixture. The yield of polymer was 15.9 g (79.5% conversion) after 16 hours at 50° C.

In addition to the monosaccharides which function as reductants in the practice of the present invention, the disaccharides which are reducing sugars per se, e.g. maltose, lactose, cellobiose and gentiobiose, as well as disaccharides which readily undergo hydrolysis to reducing monosaccharides in the aqueous environment used in suspension polymerization, e.g. sucrose, may be used in the practice of this invention, although they are generally less effective reductants than the monosaccharides. The carboxylic acid esters of the disaccharides may also be used as reductants, as illustrated by the use of sucrose octaacetate in Example IX.

While particular embodiments of this invention have been disclosed above, it will be understood that the invention is obviously subject to variation and modification without departing from its broader aspects.

What is claimed is:

1. A process for the preparation of polymers and copolymers of vinyl chloride, which consists in polymerization in bulk or suspension, in the presence of a redox catalyst system consisting of a peroxyester and a reducing agent selected from the class consisting of a monosaccharide and a carboxylic acid ester of a monosaccharide.

2. The process of claim 1 wherein the polymerization is carried out at a temperature where the peroxyester has a half-life of more than 50 hours in the absence of the reducing agent.

3. The process of claim 2 wherein said polymerization temperature is in the range from $-50°$ to $+70°$ C.

4. The process of claim 2 wherein said polymerization temperature is between 20° and 60° C.

5. The process of claim 1 wherein said peroxyester is selected from the class consisting of alkyl peroxyesters of aliphatic carboxylic acids, aromatic carboxylic acids and carbonic acid.

6. The process of claim 1 wherein said monosaccharide is selected from the class consisting of aldoses and ketoses.

7. The process of claim 6 wherein said aldose is glucose.

8. The process of claim 6 wherein said ketose is fructose.

9. The process of claim 1 wherein said carboxylic acid ester of a monosaccharide is an ester of an aliphatic acid.

10. The process of claim 9 wherein said carboxylic acid ester of a monosaccharide is an ester of acetic acid.

11. The process of claim 1 wherein said carboxylic acid ester of a monosaccharide is glucose pentaacetate.

12. The process of claim 5 wherein said peroxyester is t-butyl peroxyoctoate.

13. A process for the preparation of polymers and copolymers of vinyl chloride, which consists in polymerization in suspension, in the presence of a redox catalyst system consisting of a peroxyester and a reducing agent selected from the class consisting of a disaccharide and a carboxylic acid ester of a disaccharide.

14. A process for the preparation of polymers and copolymers of vinyl chloride, which consists in polymerization in bulk, in the presence of a redox catalyst system consisting of a peroxyester and a carboxylic acid ester of a disaccharide.

15. A process for the preparation of polymers and copolymers of vinyl chloride, which consists in polymerization in bulk or suspension, in the presence of a redox catalyst system consisting of a peroxyester, a reducing agent selected from the class consisting of a monosaccharide and a carboxylic acid ester of a monosaccharide, and a stannous or antimony (III) carboxylate.

16. The process of claim 15 wherein said stannous carboxylate is selected from the class consisting of stannous laurate and stannous octoate.

* * * * *